United States Patent
Garrity et al.

(10) Patent No.: US 8,768,795 B2
(45) Date of Patent: Jul. 1, 2014

(54) METHODS AND SYSTEMS FOR ESTIMATING RECOVERABLE UTILITY REVENUE

(75) Inventors: Jonathan Tompkins Garrity, Atlanta, GA (US); Quang Binh Dam, Atlanta, GA (US); Robert Michael Lewkovich, Smyrna, GA (US); Atul Nigam, Johns Creek, GA (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 13/612,758

(22) Filed: Sep. 12, 2012

(65) Prior Publication Data

US 2014/0074670 A1    Mar. 13, 2014

(51) Int. Cl.
*G01R 22/00*    (2006.01)

(52) U.S. Cl.
USPC ............................................. 705/30; 705/412

(58) Field of Classification Search
None
See application file for complete search history.

(56) References Cited

U.S. PATENT DOCUMENTS

| | | | |
|---|---|---|---|
| 6,990,395 B2 * | 1/2006 | Ransom et al. | 700/295 |
| 7,402,993 B2 | 7/2008 | Morrison | |
| 7,986,246 B2 * | 7/2011 | Angelis et al. | 340/870.02 |
| 2009/0045976 A1 | 2/2009 | Zoldi et al. | |

FOREIGN PATENT DOCUMENTS

| | | | |
|---|---|---|---|
| GB | 2302952 A | 5/1997 |
| GB | 2312963 A | 12/1997 |

\* cited by examiner

*Primary Examiner* — Paul Danneman
(74) *Attorney, Agent, or Firm* — Fletcher Yoder, P.C.

(57) ABSTRACT

A system includes a utility analytics system. The utility analytics system includes a non-technical utility loss system configured to derive a probability of at least one utility non-technical loss, an unbilled utility system configured to calculate an expected unbilled utility service for a customer based on customer attributes and the probability of the at least one utility non-technical loss, and a revenue recoverability system configured to calculate an expected recoverable revenue based on probability of revenue recovery and of the expected unbilled utility service.

20 Claims, 3 Drawing Sheets

METHODS AND SYSTEMS FOR ESTIMATING RECOVERABLE UTILITY REVENUE

BACKGROUND

The invention relates generally to energy delivery infrastructure, and more specifically to methods and systems for estimating recoverable revenue from non-technical losses within the energy delivery infrastructure.

Energy infrastructure, such as energy distribution grids, may include a variety of systems and components with sensors and analytics devices to detect and analyze energy data. In the energy distribution grid example, systems may include power generation systems, power transmission systems, power distribution systems, smart meters, digital communications systems, control systems, and their related components. Certain associations with the energy infrastructure may include contracts, service level agreements, and the like, detailing capitalization, cost, and revenues for the energy infrastructure. Unfortunately, all of the energy delivered via the energy infrastructure may not be billed.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A system includes a utility analytics system. The utility analytics system includes a non-technical utility loss system configured to derive a probability of at least one utility non-technical loss, an unbilled utility system configured to calculate an expected unbilled utility service for a customer based on customer attributes and the probability of the at least one utility non-technical loss, and a revenue recoverability system configured to calculate an expected recoverable revenue based on probability of revenue recovery and probability of the expected unbilled utility service.

A non-transitory computer-readable medium having code stored thereon, the code includes instructions for deriving a probability of at least one utility non-technical loss for a utility grid, deriving an expected unbilled utility service for a customer based on customer attributes and the probability of the at least one utility non-technical loss, and calculating an expected recoverable revenue based on probability of revenue recovery and probability of the expected unbilled utility service.

A method includes receiving utility service data from a plurality of meters within a utility delivery system, deriving a probability of at least one utility non-technical loss for the utility delivery system, deriving an expected unbilled utility service for a customer based on customer attributes and the probability of the at least one utility non-technical loss, and calculating an expected recoverable revenue based on probability of revenue recovery and probability of the expected unbilled utility service.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
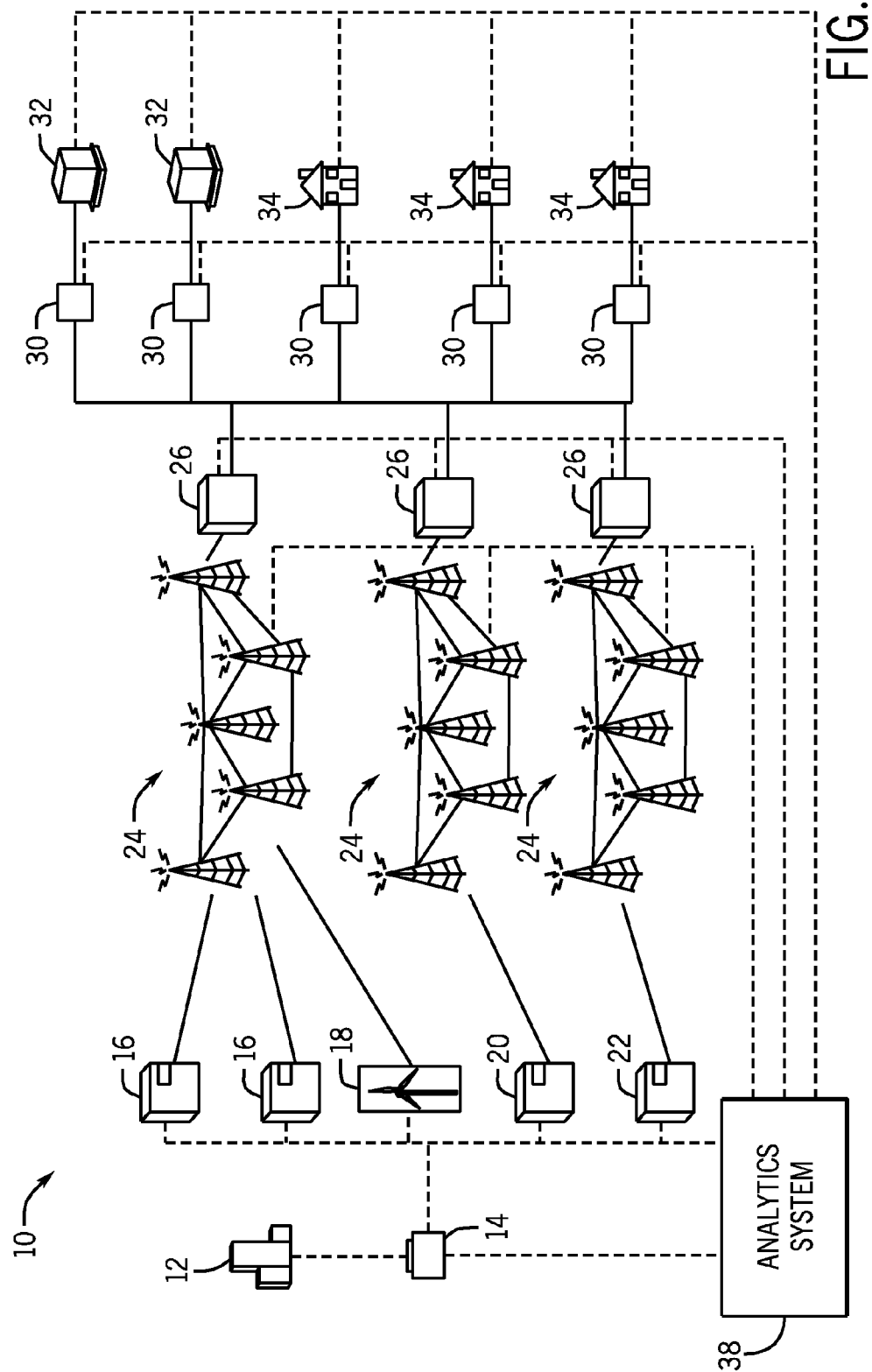
FIG. 1 is a block diagram of an embodiment of a energy generation, transmission, and distribution infrastructure system.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

Certain infrastructure, such as energy grid, may include a variety of interconnected systems and components. For example, the energy grid may include power generation systems, power transmission and distribution systems, metering systems, digital communications systems, control systems, and their related components. Non-technical associations with the energy grid may include contracts, service level agreements, and the like, detailing capitalization, cost, and expected monthly, quarterly, and annual revenues for the utility of the energy grid. Specifically, the utility and/or retail energy provider of the energy grid may continuously deliver energy to the energy grid throughout a predetermined bill cycle, which is generally one month's duration. However, other billing cycles, such as one week, bi-weekly, quarterly, and so on, may be used. Accordingly, the utility may account for the amount of energy delivered to customers of the energy grid during the bill cycle. Unfortunately, because the energy delivered to the grid may be lost due to certain losses, including technical and non-technical losses, utilities may not be able to accurately account for expected revenues from the delivered energy.

Accordingly, present embodiments relate to systems and methods useful in detecting and calculating technical and non-technical energy losses, and suitable for calculating corresponding expected recoverable revenue. Technical losses may include power distribution losses (e.g., ohmic losses, discharge losses. Advantageously, the systems and methods described herein may additionally detect and/or calculate a probability of non-technical energy losses, such as losses resulting from utility theft, meter malfunction, improper meter installations, administrative errors, and/or other human errors. In one embodiment, a computer-implemented analytics system may calculate unbilled energy for each non-technical energy loss, and may also derive an expected unbilled energy based on the probability of occurrence for each non-technical energy loss and/or the previously calculated unbilled energy. Furthermore, the analytics system may also calculate a recoverability measure of the expected unbilled energy and the expected recoverable utility revenue. As used herein, "non-technical loss" may refer to any energy and/or other utility loss notwithstanding energy losses due to the components and/or equipment of a utility delivery system, and/or those losses due to the engineering or scientific principles governing such a utility delivery system (e.g., technical losses). Technical losses may include losses due to inefficiencies in power distribution systems, the environment, (e.g., temperature effects, moisture effects), and the like. Similarly, "unbilled energy" may refer to a fraction of energy delivered to, and consumed by end users or lost that is not yet be billed. Likewise, "recoverability" may refer to the probability of recovering revenues associated with unbilled energy. It is to be noted that the techniques described herein may not be limited to electric power utilities, but may also be extended to any utility, including gas utilities, water utilities, sewage removal, and the like.

With the foregoing in mind, it may be useful to describe an embodiment of an infrastructure, such as an example energy grid system 10 illustrated in FIG. 1. It is to be noted that the systems and methods described herein may apply to a variety of infrastructure, including but not limited to power distribution infrastructure, gas delivery infrastructure, and various fluid (e.g., water) delivery infrastructure. As depicted, the energy grid system 10 may include one or more utilities 12. The utility 12 may provide for oversight operations of the energy grid system 10. For example, utility control centers 14 may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. The transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, having a conductor for each of three phases. The power transmission grid 24 may support nominal system voltages in the ranges of 110 kilovolts (kV) to 765 kilovolts (kV) or more. In the depicted embodiment, the power transmission grid 24 may be electrically coupled to a power distribution substation and grid 26. The power distribution substation and grid 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 240V, or 120V) distribution voltages. For example, industrial electric power consumers (e.g., production plants) may use a primary distribution voltage of 13.8 kV, while power delivered to commercial and residential consumers may be in the secondary distribution voltage range of 120V to 480V.

As again depicted in FIG. 1, the power transmission grid 24 and power distribution substation and grid 26 may be part of the energy grid system 10. Accordingly, the power transmission grid 24 and power distribution substation 26 may include various digital and automated technologies to control power electronic equipment such as generators, switches, circuit breakers, reclosers, and so forth. The power transmission grid 24 and power distribution substation and grid 26 may also include various communications, monitoring, and recording devices such as, for example, programmable logic controllers (PLCs) and electric fault sensing protective relays. In certain embodiments, the power transmission grid 24 and power distribution substation and grid 26 may also deliver power and communicate data such as changes in electric load demand to a meter 30.

In certain embodiments, the meter 30 may be an Advanced Metering Infrastructure (AMI) meter used to collect, measure, and analyze electric power usage and/or generation. The meter 30 may be electrically and communicatively coupled to one or more of the components of the system 10, including the power transmission grids 24, power distribution substation and grid 26, and the commercial and/or industrial consumer 32 and residential consumer 34. Additionally, the meter 30 may enable two-way communication between commercial sites 32, residences 34, and the utility control center 14, providing for a link between consumer behavior and electric power usage and/or generation. For example, the meter 30 may track and account for pre-paid energy usage and/or energy used before payment. Likewise, the utility's consumers (e.g., commercial sites 32, residences 34) may benefit from lower utility charges by optimizing their energy consumption, for example, to take advantage of lower rates during low demand hours. As noted above, electric power may also be generated by the consumers (e.g., commercial consumers 32, residential consumers 34). For example, the consumers 32, 34 may interconnect a distributed generation (DG) resource (e.g., solar panels or wind turbines) to generate and deliver power to the grid 26.

In certain embodiments, the meter 30 may include a system of electrical and electronic components such as, for example, a display, one or more processors, memory and similar storage devices, sensors, tampering detectors, and so forth. It should also be appreciated that the meter 30 may measure, calculate, store, and display an apparent power (kVA), real power (i.e., the average power consumed by the resistive component of a given load 32, 34 over a time interval) (kW), and reactive power (i.e., the power consumed by the reactive component of a given load 32, 34 over a time interval) (kvar) as a product of power and time. For example, electric utilities may report to consumers their usage and/or generation per kilowatt-hour (kWh) for billing and/or crediting purposes.

Communicatively coupled to components (e.g., utility 12, utility control center 14, power generation stations 16, 18, 20, and 22, transmission grid 24, substation and grid 26, meter 30, and so forth) of the system 10 may be an analytics system 38. In certain embodiments, the analytics system 38 may be any hardware system, software system, or combination thereof, suitable for analyzing and/or modeling energy delivery data and business data related to the system 10. For example, as will be discussed in further detail below, the analytics system 38 may include various subsystems (e.g., software systems implemented as computer executable instructions stored in a non-transitory machine readable medium) that may be used to derive and calculate business related parameters such as billed and unbilled energy, non-technical energy loss, expected revenue yields, and so forth. Accordingly, the analytics system 38 may receive continuous inputs from the power generation stations 16, 18, 20, and 22, transmission grid 24, substation and grid 26, meter 30, and so forth, and report such information to the utility 12 and/or utility control center 14. For example, the analytics system 38 may received from the power generation stations 16, 18, 20, and 22 the quantifiable amount and cost of energy generated and delivered to the transmission grid 24. Because certain energy losses (e.g., technical energy losses) may occur from transmitting energy long distances, the analytics system 38 may also receive from the transmission grid 24 and substation and grid 26 energy amounts at certain points throughout the grid 24 during the delivery of power, and calculate the total energy to be delivered to, for example, the meter 30, and by extension, commercial consumers 32, and residential consumers 34. In the same example, the analytics system 38 may receive from each meter 30 associated with commercial consumers 32 and residential consumers 34 the cost of energy, the amount of energy used at the use end point (e.g., commercial buildings, residences) and/or billed to the consumers 32, 34, the amount of energy unbilled (e.g., energy used by the consumers 32, 34 or lost over a billing cycle but has not yet been billed), time of use (TOU) data, usage profiles, and so forth.

The analytics system 38 may also include one or more processors, a memory and/or storage, input/output (I/O) ports, a network interface, an operating system, software applications, and so forth, useful in implementing the techniques described herein. Particularly, the analytics system 38 may include code or instructions stored in a non-transitory machine-readable medium (e.g., the memory and/or storage) and executed, for example, by the one or more processors that may be included in the analytics system 38. In certain embodiments, the processor, in conjunction with the memory and/or storage, may be configured to support an operating system to execute various software systems and applications. Additionally, the analytics system 38 may include a network interface, which may allow communication within the system 10 via a personal area network (PAN) (e.g., NFC), a local area network (LAN) (e.g., Wi-Fi), a wide area network (WAN) (e.g., 3G or LTE), a physical connection (e.g., an Ethernet connection, power line communication), and/or the like. In certain embodiments, the analytics system 38 may also include systems, as will be discussed in greater detail with respect to FIG. 2, to estimate recoverable revenue from non-technical energy losses.

Figure 2:
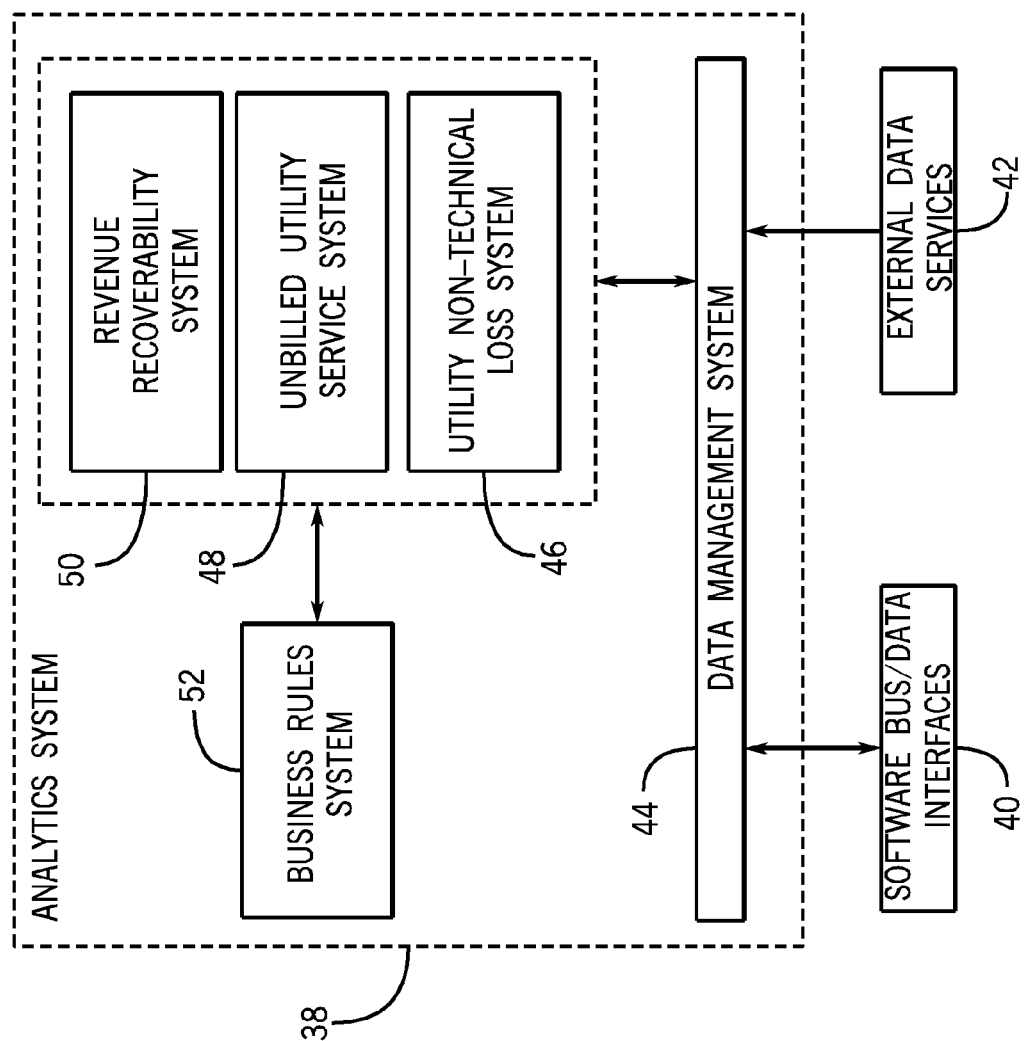
FIG. 2 is a block diagram of an embodiment of a computer-implemented analytics system included in the system of FIG. 1.

Accordingly, FIG. 2 is a block diagram of an embodiment of the analytics system 38. As noted above with respect to FIG. 1, the analytics system 38 may include various systems (e.g., hardware or software systems) that may be used to calculate and estimate recoverable revenue from non-technical utility losses, such as energy, gas, and/or water losses resulting from consumer 32, 34 theft, meter 30 malfunction, improper meter 30 installations, administrative errors (e.g., record-keeping and accounting errors), and so forth. As depicted, the analytics system 38 may include a software data bus 40 and an external data services system 42 communicatively coupled to a data management subsystem 44. The software data bus 40 may be a subsystem that transfers data between components internal to the analytics system 38 such as energy and business data received from the meter 30, commercial consumers 32, residential consumers 34, and so forth. The external data services 42 may include systems useful in exchanging data with components (e.g., utility 12, utility control center 14, generation stations 16, 18, 20, and 22, grids 24 and 26, meter 30, and so forth) external to the analytics system 38.

For example, in certain embodiments, the analytics system 38 may include an Outage Management System (OMS) that may predict and respond to outage or disruption events such as, for example, temporary and/or permanent electrical faults. Similarly, the analytics system 38 may include a Distribution Management System (DMS) suitable for re-routing energy from plants 16, 18, 20, and 22 experiencing lesser demand and away to plants 16, 18, 20, and 22 experiencing greater demand. A Geographic Information System (GIS) may be included and used to provide physical location information of the components (e.g., electrical conductors, transformers, distribution substations, nodes, etc.) of grids 24 and 26 components the meter 30, the commercial consumers 32, and the residential consumers 34. The physical location information may be used, for example, to create energy usage visualizations to display various energy usage and generation locations on a map or other suitable visual medium (e.g. chart).

Still similarly, the analytics system 38 may include a Customer Information System (CIS) used to obtain customer information (e.g., consumers 32, 34), including billing information, energy usage information, billing rates, load profiles and the like. An included Meter Data Management (MDM) system may perform data storage and management for large quantities of energy data that may be received, for example, from the meter 30. Such data may primarily include usage data, events data (e.g., tamper events, meter failure events, power transmission failure events), alarms, and/or alerts that are received from the meter 30 via AMI or Automatic Meter Reading (AMR) systems. Yet still, the analytics system 38 may also include a Meter Data Repository (MDR) which calculates the amount of electricity used, for example, during peak, near-peak, and off-peak hours. The analytics system 38 may also include data from the external data services 42 such as weather prediction systems (e.g., Global Forecast System, Doppler radars, and so forth) as the weather may affect the transmission and delivery of energy via the grids 24 and 26 to the meters 30 associated with consumers 32, 34. The data management system 44 may be configured to support an operating system to manage the various data received via the OMS, DMS, GIS, CIS, MDM, MDR, and AMI systems, and communicate that data to subsystems such as a non-technical energy loss detection system 46, a calculation of unbilled energy (or unbilled gas, unbilled water) system 48, and a calculation of revenue recoverability in system 50.

In certain embodiments, the utility non-technical loss system 46 may be a software system, a hardware system, or a combination thereof, that may be used to detect and/or estimate non-technical energy losses such as losses resulting from consumer theft, meter (e.g., meter 30) malfunction, improper meter installations, administrative errors (e.g., utility record-keeping and accounting errors), and so forth. Particularly, while technical energy losses may be the result of equipment wear, electrical faults due to inclement weather, and the like, non-technical energy losses may result from occurrences external to the components and/or equipment of the power system (e.g., system 10), for example, consumer 32, 34 theft, meter 30 malfunction, meter 30 tampering, and so forth. Such non-technical energy losses may result in financial and/or revenue loss for the utility (e.g., utility 12). It would be advantageous to detect and/or to predict the occurrence of such non-technical losses, as described herein.

The utility non-technical loss system 46 may use the data received via the external data services system 42 (e.g., OMS, DMS, GIS, CIS, MDM, MDR, and AMI data) to detect and account non-technical losses that may occur, for example, within the system 10 discussed with respect to FIG. 1. More specifically, the utility non-technical loss system 46 may perform calculations and analysis using the received data (e.g., from a CIS, MDM, MDR) and certain criteria or predetermined rules generated by a business rules system 52 that may be included in the analytics system 38. For example, the utility non-technical loss system 46 may be configured to calculate non-technical energy losses based on utility business rules such as the detection of meters 30 having concurrent disconnected service and active usage (i.e., unauthorized electricity and/or energy usage), meter 30 data readings that are bypassed at certain times of day, detectable meters 30 that may not have produced readings or events for a number of hours, days, months, years, and so forth, meters 30 with an excessive number of certain events (e.g., electrical switching, activation and/or deactivation, electrical transient noise, etc.), meters 30 with unusual consumption patterns, meters 30 having tamper events, and so forth. The business rules system 52 may also generate one or more financial business rules to derive a prioritization of cases of utility non-technical losses. For example, the financial business rules may account for business resources such as, time, effort (e.g., man-hours), and money required to pursue a one or given cases of utility non-technical losses. That is, the business rules system 52 may generate a return on investment (ROI) for the utility 12 to pursue given consumer 32, 34 accounts suspected of non-technical loss, such that the utility may be allowed to compare expected recoverable revenue to the costs that may be incurred to recover the revenue.

In one embodiment, the utility non-technical loss system 46 may also calculate and detect non-technical energy losses by comparing energy usage data of a cluster of meters 30 in certain geographical areas (e.g., counties, regions, cities, communities, and neighborhoods and consumer environments (e.g., industrial, commercial, public infrastructure, residential) with other meters 30 of the same geographical area or consumer environment. For example, the energy usage data of each meter 30 associated with a residential consumer 34 may be compared with the energy usage of the other residential consumers 34 within the same neighborhood.

In certain embodiments, the utility non-technical loss system 46 may also calculate the probability of each category of non-technical energy losses including consumers 32, 34 theft, meter 30 malfunction, meter 30 tampering, improper meter 30 installations, and administrative errors. For example, the utility non-technical loss system 46 may combine the calculations based on energy usage data and the predetermined criteria with certain demographic data of consumers 32, 34 such as financial history (e.g., credit history, history of missed or late payments, long term and short term debts, cash accounts, etc.), employment (e.g., occupation), income (e.g., monthly and annually), criminal background, driving and vehicle history, utility billing and payment data, and similar comparative criteria for neighboring consumers 32, 34. Accordingly, the result may be a recoverability for each category of non-technical energy loss. In one embodiment, a machine learning model may be used to refine the calculations and probabilities to generate historical and predictive energy usage data. As will be further appreciated, the non-technical energy loss calculations and probability of each non-technical energy loss may be used to calculate expected unbilled energy and the expected recoverable revenue due to non-technical energy losses. In other embodiments, techniques such as statistical methods (e.g., linear regression, non-linear regression, data mining) and artificial intelligence models (e.g., expert systems, fuzzy logic, support vector machines [SVMs], logic reasoning systems) may be used to generate historical and/or predictive energy usage data.

Similar to the utility non-technical loss system 46, the calculation of unbilled utility service system 48 may be a software system, a hardware system, or a combination thereof, which may be used to calculate the unbilled energy for each category of non-technical energy loss. As previously noted, unbilled energy may refer to the fraction of energy delivered to, for example, the meter 30 (e.g., associated with consumers 32, 34) that may not yet necessarily be billed to the consumers 32, 34. As energy usage may not become apparent to the utility 12 until the end of each bill cycle, the unbilled energy may be estimated for business related purposes such as monthly, quarterly, and/or annual accounting. For example, while the utility 12 may deliver approximately 5,000 kWh of electric power for a given month to a residential consumer 32, the utility 12 and/or other retail provider may not bill the consumer 32 until the meter 30 associated with consumer 32 is read to determine usage at the end of the billing cycle. However, revenues associated with such unbilled energy may still be estimated by the utility 12 for business and accounting purposes. It should also be appreciated that unbilled energy may result from the previously discussed non-technical energy losses. Accordingly, the calculation of unbilled utility service system 48 may use received data (e.g., from a MDM) to generate a load profile (i.e., an electrical load variation over a time interval) for each meter 30 based on energy usage data of various clusters of consumers 32, 34.

For example, in certain embodiments, the unbilled utility service system 48 may generate a number of clusters of meters 30 associated with the consumers 32, 34. In one embodiment, the unbilled utility service system 48 may implement k-means clustering techniques to model load profiles of various consumer 32, 34 clusters. Particularly, models of the load profiles of each meter 30 within the cluster may be grouped into a k number of sets or clusters to estimate an expected load profile for each meter 30 within the cluster. In this manner, the unbilled energy of one or more meters 30 associated, for example, with the consumers 32, 34 may be calculated as the integral of the difference between the expected load profile and the received energy usage of the consumer 32, 34 over a defined bill cycle. That is, certain customer attributes may be used in a historical analysis of customer use (e.g., consumer 32, 34) to derive the unbilled utility service. The customer attributes may include GIS inputs (high crime areas), data mining, statistical analysis, average square footage of the home of the residential consumer 34, temperature normalization, and so forth. Other techniques may be used to model load profiles, to predict expected energy consumption, and/or to derive variances from observed consumption patterns. For example, the unbilled utility service system 48 may use linear regression, non-linear regression, analysis of variance (ANOVA), classification and regression tree (CART) analysis, Chi square automatic interaction detection (CHAID), nearest neighbor algorithms, cluster analysis techniques, naïve Bayes and Bayesian belief networks, support vector machines (SVMs), neural networks, and so on.

Additionally, the unbilled energy calculation may be continuously adjusted as unbilled energy may vary from one billing cycle to another due to weather variation, the date and time that the meter 30 is read, seasonal changes, holidays and weekends, and so forth. That is, the prediction of energy consumption, variances, expected unbilled energy, and/or recoverability measures for revenue (e.g., dollars to be recovered, percent of revenue to be recovered, probability of recovery) may be continuously updated, for example, hourly, daily, weekly, and/or monthly. Furthermore, an expected unbilled energy may be calculated for each category of the non-technical energy losses (e.g., theft by consumers 32, 34 theft, meter 30 malfunction, meter 30 tampering, etc.) as a product of the probability of each category of non-technical energy loss and the calculated unbilled energy. In this way, the utility 12 may have a more accurate estimate of expected unbilled energy. The expected unbilled energy, particularly the expected unbilled energy from non-technical energy losses, may be used to generate expected recoverable revenue that would otherwise be lost, for example, by the utility 12 due to inaction.

Accordingly, the calculation of revenue recoverability system 50 may be a software system, a hardware system, or a combination thereof, used to calculate the recoverability and expected recoverable revenue of the utility 12. As noted above, the recoverability may refer to a probability of recovering revenues lost based on the expected unbilled energy calculation computed, for example, by the unbilled utility service system 48. Other recoverability measures may include an amount (e.g., in dollars) that may be recovered, and a percent of lost energy that may be recovered. In certain embodiments, the revenue recoverability system 50 may rank recoverability based on certain criteria such as the category of non-technical energy loss, type of consumers 32, 34 (e.g., industrial, commercial, residential, etc.) consumer 32, 34 demographics data (e.g., credit history, utility billing and payment history, etc.), GIS and related data (e.g., crime maps, urban concentration maps, rural concentration maps, physical conduit or wire maps, insurance maps, flooding maps), and so forth. For example, the revenue recoverability system 50 may rank non-technical energy losses such as a meter 30 malfunctions and installation errors as having the highest recoverability and economic value, as such anomalies may be detectable and corrected to recover future (e.g., next occurring billing cycle) revenues. By ranking the revenue recoverability, resources may be focused on accounts that may include more recoverable revenue. Accordingly, resources may be more optimally assigned and return on effort may be maximized. Other non-technical energy losses such as consumer 32, 34 theft may have the lower recoverability, as consumer 32, 34 theft may significantly vary from one billing cycle to the next, as well as from consumer to consumer. For example, industrial and commercial consumers 32 may be attributed a higher recoverability than residential consumers 34, as the energy consumption of industrial and commercial consumers 32 may be directly related to their business operations.

In certain embodiments, the revenue recoverability system 50 may also calculate expected recoverable revenue for the utility 12. Such expected recoverable revenue may reflect monthly, quarterly, and/or annual energy sales revenues. In one embodiment, the revenue recoverability system 50 may be used to calculate the expected unbilled energy for a billing cycle (e.g., month) as a product of the recoverability of each non-technical loss with the expected unbilled energy and billing rate. For example, as previously discussed, energy utilities (e.g., utility 12) may report to consumers 32, 34 their usage per kWh for billing purposes. Having calculated the recoverability of each category of non-technical energy loss, the revenue recoverability system 50 may estimate the expected recoverable revenue based on the expected unbilled energy and energy usage billing rate (e.g., price per kWh).

Figure 3:
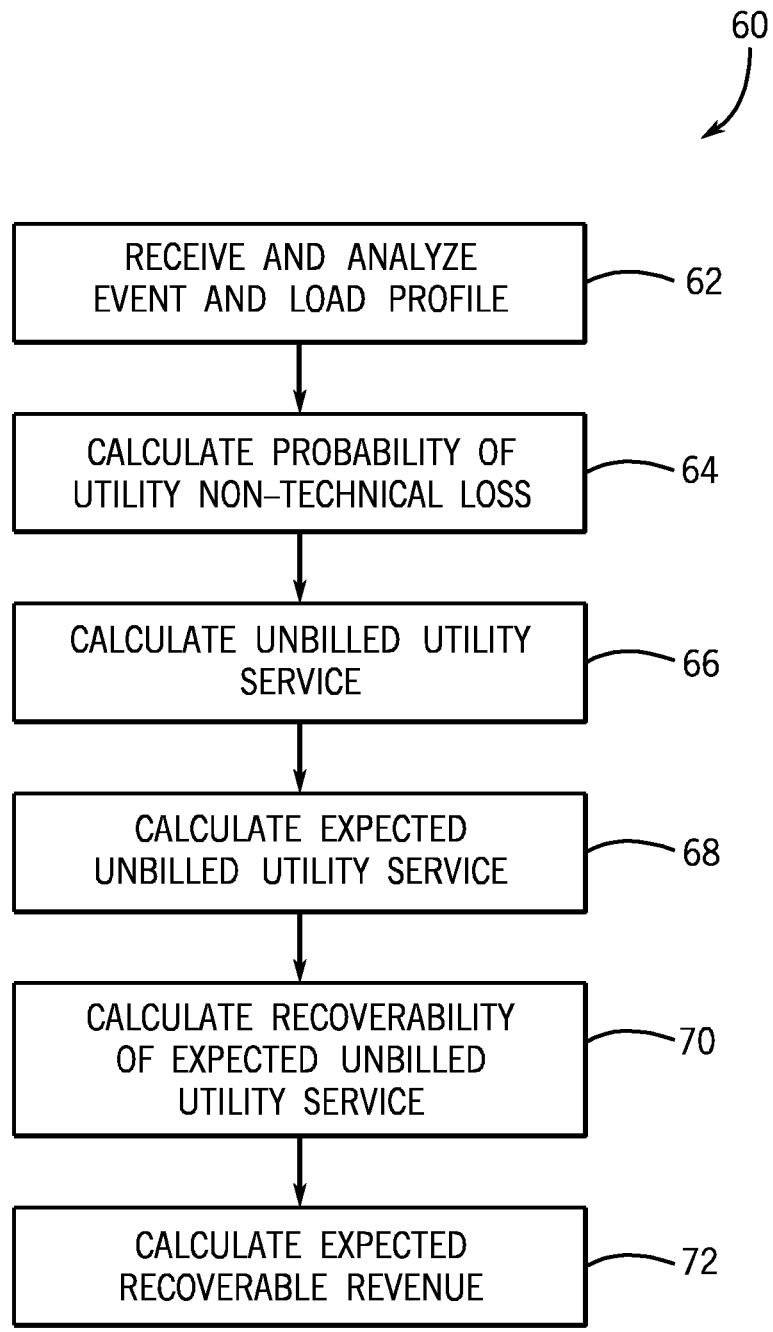
FIG. 3 is a flowchart illustrating an embodiment of a computer-implemented process suitable for detecting and calculating utility non-technical losses and estimating recoverable revenue in accordance with present embodiments.

Turning now to FIG. 3, a flow diagram is presented, illustrating an embodiment of a process 60 useful in detecting and calculating utility non-technical losses and estimating recoverable revenue, by using, for example, the analytics system 38 included in the system 10 depicted in FIG. 1. The process 60 may include code or instructions stored in a non-transitory machine-readable medium (e.g., a memory) and executed, for example, by one or more processors included in the analytics system 38. The process 60 may begin with the analytics system 38 receiving and analyzing (block 62) event and load profile data. For example, as previously discussed, the analytics system 38 may receive energy usage and other energy data via various OMS, DMS, GIS, CIS, MDM, MDR, and AMI systems for processing and analysis. Other data may also be received and analyzed, including energy utilization data, technical loss data, economic data (e.g., markets for energy data), weather related data, regulatory data (e.g., effects of regulations on pricing and customer usage), GIS and related data (e.g., crime maps, urban concentration maps, rural concentration maps, physical conduit or wire maps, insurance maps, flooding maps), and so on received, for example, via the external data services system 42. The process 60 may continue using the analytics system 38 to detect and calculate (block 64) non-technical energy losses and the probability of each of a number of non-technical energy losses based on, for example, business rules such as the detection of active meters 30 with unauthorized electricity and/or energy service.

The process 60 may then continue with the analytics system 38 calculating (block 66) unbilled utility service for one or more bill cycles. Based upon the calculation (e.g., block 64) of utility non-technical losses and the calculation (e.g., block 66) of unbilled utility service, the analytics system 38 may then calculate (block 68) an expected unbilled utility service. Accordingly, the utility 12 may have a more accurate prediction of the expected unbilled utility service for business purposes. Next, the analytics system 38 may calculate (block 70) a recoverability of the expected unbilled utility service. For example, the recoverability may be the probability of recovering revenues lost based on the expected unbilled utility service calculation, and may be expressed, for example, as a percent of lost energy that may be recovered. As noted above with respect to FIG. 2, the recoverability of expected unbilled utility service may also be ranked according to business rules such as the category of utility non-technical loss and consumer 32, 34 demographics data. Accordingly, the utility 12 may have access to information to pursue lost revenues according to the likelihood of recouping those revenues, or according to the financial cost and/or benefit of the revenue recovery. The process 60 may conclude with the analytics system 38 calculating (block 72) expected recoverable revenue. As again noted above, the expected recoverable revenue may be calculated and estimated based on the recoverability, the expected unbilled utility service, and utility billing rate. In this manner, the utility 12 may have a calculated value for recoverable revenue for one or more given bill cycles allowing the utility 12, for example, to make more informed business determinations on matters such as investigating and accounting utility non-technical losses, business planning and investment, and pursuing the expected recoverable revenue. More specifically, an ROI may be generated for the utility 12 to pursue given consumer 32, 34 accounts suspected of non-technical loss, such that the utility may be allowed to compare expected recoverable revenue to the costs required to recover the revenue.

Technical effects of the disclosed embodiments include an analytics system configured to detect and calculate non-technical energy losses, and calculate expected recoverable utility revenue. Particularly, the analytics system detects and calculates a probability of non-technical energy losses such as losses resulting from consumer theft, meter malfunction, improper meter installations, and administrative errors. Technical losses may also be detected and used by the system and methods described herein. The analytics system may then calculate the unbilled energy for each non-technical energy loss, and an expected unbilled energy based on the probability of each non-technical energy loss and the calculated unbilled energy. Furthermore, the analytics system may also calculate a recoverability of the expected unbilled energy and the expected recoverable revenue. The recoverability may include a probability measure, and the expected recoverable revenue may include a total value measure (e.g., dollars, euro, yen) and/or a percentage measure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a processor configured to execute a utility analytics system, an unbilled utility system, and a revenue recoverability system, wherein:
   the utility analytics system comprises:
   a non-technical utility loss system configured to derive a probability of at least one utility non-technical loss;
   the unbilled utility system is configured to calculate an expected unbilled utility service for a customer based on customer attributes and the probability of the at least one utility non-technical loss; and
   the revenue recoverability system is configured to calculate an expected recoverable revenue based on probability of revenue recovery and of the expected unbilled utility service.

2. The system of claim 1, wherein the at least one utility non-technical loss comprises at least one non-technical energy loss, at least one non-technical water loss, at least one non-technical gas loss, or a combination thereof.

3. The system of claim 2, wherein the at least one utility non-technical loss comprises a theft loss, a meter malfunction loss, a meter installation error loss, an administrative error, or a combination thereof.

4. The system of claim 1, comprising a business rules system having at least one business rule, wherein the business rules system is configured to derive a priority of cases of non-technical utility loss based at least in part on the at least one business rule.

5. The system of claim 1, wherein the non-technical utility loss system is configured to use at least one utility business rule to derive the probability of at least one utility non-technical loss, and wherein the at least one utility business rule comprises a detection of a utility meter having unauthorized utility usage; a detection of the utility meter having a bypassed data reading; a detection of the utility meter having produced no data reading for a period of time, a detection of the utility meter having a plurality of activations, a plurality of deactivations, or a combination thereof; a detection of the utility meter having an unusual consumption pattern; a detection of the utility meter having a tamper event; or a combination thereof.

6. The system of claim 1, wherein the unbilled utility system is configured to calculate the expected unbilled utility service by:
   generating a customer load profile for the customer based at least in part on a plurality of load profiles derived from data received from a plurality of meters within the utility grid;
   computing an integral of a difference between the customer load profile and an observed customer utility usage data received after a period of time from the plurality of meters; and
   multiplying the integral with the probability of the at least one utility non-technical loss.

7. The system of claim 6, wherein the plurality of meters does not include a meter servicing the customer.

8. The system of claim 1, wherein the revenue recoverability system is configured to calculate the expected recoverable revenue by computing one or more products of a recoverability of the utility non-technical loss, the expected unbilled utility service, and a utility billing rate.

9. The system of claim 8, wherein the recoverability of the utility non-technical loss comprises a recoverability of one of a plurality of utility non-technical losses.

10. The system of claim 1, wherein the utility analytics system comprises an Advanced Metering Infrastructure (AMI), an Outage Management System (OMS), a Distribution Management System (DMS), a Geographic Information System (GIS), a Customer Information System (CIS), a Meter Data Management System (MDM), a Meter Data Repository (MDR), or a combination thereof.

11. A tangible non-transitory computer-readable medium having computer executable code stored thereon, the code comprising instructions for:
   deriving a probability of at least one utility non-technical loss for a utility grid;
   deriving an expected unbilled utility service for a customer based on customer attributes and the probability of the at least one utility non-technical loss; and
   calculating an expected recoverable revenue based on probability of revenue recovery and of the expected unbilled utility service.

12. The tangible non-transitory computer-readable medium of claim 11, wherein the code comprises instructions for deriving a priority of cases of non-technical utility loss based at least in part on at least one business rule.

13. The tangible non-transitory computer-readable medium of claim 11, wherein the code comprises instructions for:
   generating a customer load profile for the customer based at least in part on a plurality of load profiles derived from data received from a plurality of meters within the utility grid;
   computing an integral of a difference between the customer load profile and an observed customer utility usage data received after a period of time from the plurality of meters; and
   multiplying the integral with the probability of the at least one utility non-technical loss.

14. The tangible non-transitory computer-readable medium of claim 13, wherein the code comprises instructions for calculating an expected unbilled utility, wherein the expected unbilled utility comprises a product of the probability of the at least one utility non-technical loss and the actual unbilled utility.

15. The tangible non-transitory computer-readable medium of claim 11, wherein the code comprises instructions for calculating a lost revenue yield, wherein the lost revenue yield is a based on the at least one utility non-technical loss.

16. The tangible non-transitory computer-readable medium of claim 11, wherein the code comprises instructions for calculating an expected recoverable revenue, wherein the expected recoverable revenue is based at least in part on the probability of revenue recovery, the probability of the at least one utility non-technical loss, and the unbilled utility.

17. A method, comprising:
receiving utility service data from a plurality of meters within a utility delivery system;
deriving, using a processor, a probability of at least one utility non-technical loss for the utility delivery system;
deriving, using the processor, an expected unbilled utility service for a customer based on customer attributes and the probability of the at least one utility non-technical loss; and
calculating, using the processor, an expected recoverable revenue based on probability of revenue recovery and of the expected unbilled utility service.

18. The method of claim 17, wherein receiving utility service data comprises receiving a notification from an Advanced Metering Infrastructure (AMI), an Outage Management System (OMS), a Distribution Management System (DMS), a Geographic Information System (GIS), a Customer Information System (CIS), a Meter Data Management System (MDM), a Meter Data Repository (MDR), or a combination thereof.

19. The method of claim 17, comprising ranking, using the processor, recoverability of the at least one utility non-technical loss according to economic value, wherein the utility non-technical loss comprises a theft loss, a meter malfunction loss, a meter installation error loss, an administrative error, or a combination thereof.

20. The method of claim 17, wherein calculating, using the processor, the expected recoverable revenue comprises calculating, using the processor, one or more products of a recoverability of the utility non-technical loss, the expected unbilled utility service, and a utility billing rate.

\* \* \* \* \*